United States Patent
Salomon et al.

(10) Patent No.: US 11,474,515 B2
(45) Date of Patent: Oct. 18, 2022

(54) METHOD AND CONTROL APPARATUS FOR AN AUTONOMOUS AND/OR SEMIAUTONOMOUS TRANSPORT VEHICLE

(71) Applicants: Jörg Salomon, Bonn (DE); Ruben Regenbogen, Aachen (DE)

(72) Inventors: Jörg Salomon, Bonn (DE); Ruben Regenbogen, Aachen (DE)

(73) Assignee: StreetScooter GmbH, Aachen (DE)

( * ) Notice: Subject to any disclaimer, the term of this patent is extended or adjusted under 35 U.S.C. 154(b) by 288 days.

(21) Appl. No.: 16/041,492

(22) Filed: Jul. 20, 2018

(65) Prior Publication Data
US 2019/0025821 A1 Jan. 24, 2019

(30) Foreign Application Priority Data
Jul. 20, 2017 (DE) .......................... 102017116421.9

(51) Int. Cl.
*G05D 1/00* (2006.01)
*G08G 1/00* (2006.01)
(Continued)

(52) U.S. Cl.
CPC ....... *G05D 1/0027* (2013.01); *G01C 21/3438* (2013.01); *G05D 1/0088* (2013.01);
(Continued)

(58) Field of Classification Search
CPC .. G05D 1/0027; G05D 1/0293; G05D 1/0088; G05D 2201/0213; G08G 1/22;
(Continued)

(56) References Cited

U.S. PATENT DOCUMENTS

| 9,904,900 B2* | 2/2018 | Cao ........................ G06Q 50/30 |
| 2003/0182183 A1* | 9/2003 | Pribe ........................ G08G 1/22 |
| | | 705/13 |

(Continued)

FOREIGN PATENT DOCUMENTS

| CN | 103383780 A | 11/2013 |
| CN | 107850895 A | 3/2018 |

(Continued)

*Primary Examiner* — Angelina Shudy
*Assistant Examiner* — Mohamed Abdo Algehaim
(74) *Attorney, Agent, or Firm* — Reinhart Boerner Van Deuren P.C.

(57) ABSTRACT

The disclosure provides, inter alia, a method that includes obtaining transport information for a transport order, wherein the transport information represents at least one destination position. The method includes obtaining transport convoy information, wherein the transport convoy information represents at least one identifier of a transport convoy, and wherein a planned route of the transport convoy and a transport route between the current position of the transport vehicle and the destination position associated with the transport order comprise a common route section. The method also includes capturing and/or causing the capture of a first surroundings parameter, detecting the transport convoy at least in part based on the captured first surroundings parameter and the obtained transport convoy information, and if the transport convoy is detected, following the transport convoy in the transport vehicle and/or causing the transport vehicle to follow the transport convoy.

19 Claims, 4 Drawing Sheets

(51) Int. Cl.
 *G05D 1/02* (2020.01)
 *G06V 20/58* (2022.01)
 *G01C 21/34* (2006.01)

(52) U.S. Cl.
 CPC ......... *G05D 1/0293* (2013.01); *G06V 20/584* (2022.01); *G08G 1/205* (2013.01); *G08G 1/22* (2013.01); *G05D 2201/0213* (2013.01)

(58) Field of Classification Search
 CPC ............... G08G 1/205; G01C 21/3438; G06K 9/00825; G06Q 10/047; G06Q 50/30; G06V 20/584
 USPC .......................................................... 701/23
 See application file for complete search history.

(56) References Cited

U.S. PATENT DOCUMENTS

| | | | | |
|---|---|---|---|---|
| 2010/0078962 | A1* | 4/2010 | Kronenberg | B62D 53/00 296/180.2 |
| 2010/0082179 | A1* | 4/2010 | Kronenberg | B62D 35/001 701/1 |
| 2014/0095350 | A1* | 4/2014 | Carr | G06Q 10/08355 705/26.8 |
| 2016/0054736 | A1* | 2/2016 | Koi | G01C 21/3469 701/96 |
| 2016/0171894 | A1* | 6/2016 | Harvey | G08G 1/22 701/23 |
| 2016/0347452 | A1* | 12/2016 | Stanek | B64C 39/00 |
| 2016/0364678 | A1* | 12/2016 | Cao | G06Q 50/30 |
| 2017/0090271 | A1* | 3/2017 | Harris | G06K 9/0063 |
| 2017/0115666 | A1* | 4/2017 | Kolhouse | B60W 30/165 |
| 2017/0160735 | A1* | 6/2017 | Mikan | G08G 5/0034 |
| 2017/0190422 | A1* | 7/2017 | Beaman | B64C 37/02 |
| 2017/0232943 | A1* | 8/2017 | Brooks | B61G 5/02 701/19 |
| 2017/0293296 | A1* | 10/2017 | Stenneth | G06Q 20/10 |
| 2018/0107211 | A1* | 4/2018 | Schubert | B64D 1/08 |
| 2018/0225975 | A1* | 8/2018 | Park | G08G 1/052 |
| 2018/0261112 | A1* | 9/2018 | O'Brien | B64D 1/08 |
| 2018/0281657 | A1* | 10/2018 | Healey | G05D 1/0234 |
| 2018/0292817 | A1* | 10/2018 | Yang | G08G 5/0013 |
| 2018/0297703 | A1* | 10/2018 | Tian | B64C 39/024 |
| 2019/0220044 | A1* | 7/2019 | Ruth | G06Q 10/00 |
| 2019/0272760 | A1* | 9/2019 | McQuillen | G08G 1/163 |
| 2019/0295426 | A1* | 9/2019 | Nilsson | G05D 1/0005 |
| 2021/0366288 | A1* | 11/2021 | Kim | G08G 1/22 |

FOREIGN PATENT DOCUMENTS

| | | |
|---|---|---|
| DE | 10 2015 008 353 A1 | 2/2016 |
| WO | WO 2012/105889 A1 | 8/2012 |
| WO | WO 2014/092628 A1 | 6/2014 |
| WO | WO 2016/183525 A1 | 11/2016 |

\* cited by examiner

METHOD AND CONTROL APPARATUS FOR AN AUTONOMOUS AND/OR SEMIAUTONOMOUS TRANSPORT VEHICLE

CROSS-REFERENCE TO RELATED PATENT APPLICATIONS

This patent application claims priority to German Application No. 102017116421.9, filed Jul. 20, 2017, the entire teachings and disclosure of which are incorporated herein by reference thereto.

FIELD OF THE INVENTION

Exemplary embodiments of the invention relate to autonomous and/or semiautonomous vehicles, in particular a method and a control apparatus for an autonomous and/or semiautonomous vehicle.

BACKGROUND OF THE INVENTION

In the prior art, autonomous and/or semiautonomous transport vehicles are known that are used for transporting shipments to a destination position and/or for deliveries of shipments at a destination position, for example. These transport vehicles can move autonomously and/or semiautonomously to the destination position. However, the transport vehicles can move autonomously or semiautonomously only within narrow system limits. By way of example, such transport vehicles configured as a land vehicle move autonomously only at low speeds and, in the case of complex surroundings situations (e.g. at a junction or in a busy pedestrian zone), wait until the complex surroundings situation has resolved itself or a user has steered the transport vehicle out of the complex surroundings situation. These transport vehicles are therefore not suitable for fast transport of shipments over longer distances or in areas in which complex surroundings situations of this kind frequently arise.

BRIEF SUMMARY OF THE INVENTION

The present invention is therefore based, inter alia, on the object of overcoming these problems.

According to one exemplary aspect of the invention, a method performed by an autonomous and/or semiautonomous transport vehicle and/or a control apparatus for an autonomous and/or semiautonomous transport vehicle is disclosed, wherein the method comprises:
  obtaining pieces of transport information for a transport order, wherein the pieces of transport information represent at least one destination position associated with the transport order;
  obtaining pieces of transport convoy information, wherein the pieces of transport convoy information represent at least one identifier of a transport convoy, and wherein a planned route of the transport convoy and a transport route between the current position of the transport vehicle and the destination position associated with the transport order comprise a common route section;
  capturing and/or causing the capture of a first surroundings parameter;
  detecting the transport convoy at least in part based on the captured first surroundings parameter and the obtained pieces of transport convoy information; and
  if the transport convoy is detected, following the transport convoy in the transport vehicle and/or causing the transport vehicle to follow the transport convoy.

The control apparatus corresponds, by way of example, to the control apparatus for an autonomous and/or semiautonomous transport vehicle that is disclosed below.

According to a further exemplary aspect of the invention, a control apparatus for an autonomous and/or semiautonomous transport vehicle is further disclosed, wherein the control apparatus comprises means configured for performing a disclosed method or respective means for performing the steps of a disclosed method.

In this case, different steps can be performed at least in part by different means and/or at least in part by the same means.

The means of the disclosed apparatus can comprise hardware and/or software components. The means can comprise, by way of example, at least one memory having program instructions of a computer program (e.g. of the computer program disclosed below) and at least one processor configured for executing program instructions from the at least one memory. Accordingly, the intention, according to the invention, is also for an apparatus to be understood as being disclosed that comprises at least one processor and at least one memory having program instructions, wherein the at least one memory and the program instructions are configured so as, together with the at least one processor, to cause an apparatus to perform and/or control a disclosed method.

For example, the disclosed control apparatus comprises communication means. The communication means of the control apparatus are, by way of example, configured to communicate with an (e.g. remote) apparatus indirectly (e.g. via communication means of the transport vehicle) and/or directly and to send and/or receive pieces of information (e.g. the pieces of transport information and/or the pieces of transport convoy information).

An example of such communication means is a communication interface. For example, the communication means of the disclosed control apparatus comprise a communication interface using a wireless and/or wired communications technique.

An example of a wireless communications technique is a local radio technique, such as radio frequency identification (RFID) and/or near field communication (NFC) and/or Bluetooth (e.g. Bluetooth version 2.1 and/or 4.0) and/or wireless local area network (WLAN). RFID and NFC are, by way of example, specified according to ISO standards 18000, 11784/11785 and ISO/IEC standard 14443-A and 15693. The Bluetooth specifications are currently available on the Internet at www[dot]Bluetooth[dot]org. WLAN is specified in the standards of the IEEE-802.11 family, for example. A further example of a wireless communications technique is a multilocation radio technique such as, for example, a mobile radio technique, for example Global System for Mobile Communications (GSM) and/or Universal Mobile Telecommunications System (UMTS) and/or Long Term Evolution (LTE). The GSM, UMTS and LTE specifications are maintained and developed by the 3rd Generation Partnership Project (3GPP) and are currently available on the Internet at www[dot]3gpp[dot]com, inter alia. Further, a wireless communications technique is, by way of example, also intended to be understood to mean a communications technique based on the transmission of optical signals (e.g. infrared signals such as infrared signals according to the IrDA standard maintained and specified by the Infrared Data Association (IrDA)) and/or acoustic signals (e.g. ultrasonic signals).

Alternatively or additionally, the communication means of the disclosed control apparatus are, by way of example, configured to communicate with the transport vehicle and/or with means of the transport vehicle. For example, the communication means of the control apparatus comprise a vehicle interface such as an interface of a vehicle bus and/or a vehicle diagnosis interface. Such a vehicle interface renders the control apparatus connectable and/or connected to the transport vehicle and/or to means of the transport vehicle (e.g. to communication means of the vehicle), for example. An example of a vehicle bus is a controller area network bus (CAN bus), a K-line bus, an L-line bus and/or an IDB-1394 bus. An example of a vehicle diagnosis interface is a K-line interface, an L-line interface and/or an onboard diagnosis interface (OBD interface).

It goes without saying that the invention is not restricted to the exemplary cited wireless and wired communications techniques, and other communications techniques are also intended to be understood as covered by the invention.

Alternatively or additionally, the means of the control apparatus can comprise one or more position capture means (e.g. one or more position sensors), one or more capture means (e.g. one or more sensors) and/or one or more user interfaces (e.g. a keyboard, a mouse, a camera, a screen, a touch sensitive screen, a loudspeaker, a microphone, etc.). It goes without saying that the control apparatus can also comprise other means not listed.

The disclosed control apparatus is part of an autonomous and/or semiautonomous transport vehicle, for example.

According to a further exemplary aspect of the invention, an autonomous and/or semiautonomous transport vehicle is further disclosed, wherein the transport vehicle comprises:
   a disclosed control apparatus for an autonomous and/or semiautonomous transport vehicle.

According to the invention, a system is disclosed that comprises the following:
   a disclosed autonomous and/or semiautonomous transport vehicle;
   a transport convoy.

Further, the disclosed system can optionally comprise a remote apparatus, for example a remote transport service apparatus. A transport service apparatus is, by way of example, a server of a transport service, for example a (e.g. central) backend server of the transport service. The transport service apparatus is used, by way of example, for arranging and planning transport orders and/or transport routes for transport vehicles of the transport service. A transport service is, by way of example, a delivery service, a postal service, a parcel service and/or a carrier service.

According to a further exemplary aspect of the invention, a computer program is further disclosed, wherein the computer program comprises program instructions that are configured so as, when executed by at least one processor, to cause an apparatus (e.g. a disclosed control apparatus for an autonomous and/or semiautonomous transport vehicle) to perform a disclosed method.

The disclosed computer program may, by way of example, be distributable via a network such as the Internet, a telephone or mobile network and/or a local area network. The disclosed computer program may at least in part be software and/or firmware. It may equally be implemented at least in part as hardware. The disclosed computer program may, by way of example, be stored on a computer-readable storage medium, e.g. a touchable, magnetic, electrical, electromagnetic, optical and/or other kind of storage medium. The storage medium may, by way of example, be part of a processor, for example a (nonvolatile or volatile) program memory and/or main memory of a processor or a part thereof.

The disclosed method, the disclosed control apparatus, the disclosed system and the disclosed computer program are, by way of example, for an autonomous and/or semiautonomous transport vehicle (and/or for multiple autonomous and/or semiautonomous transport vehicles).

The properties of the disclosed method, the disclosed control apparatus, the disclosed transport vehicle, the disclosed system and the disclosed computer program are described—in part by way of example—below.

The disclosed control apparatus for an autonomous and/or semiautonomous transport vehicle is, by way of example, a control apparatus installed in a transport vehicle in the factory and controls a plurality of functions and/or means of the vehicle. However, it is also conceivable for the control apparatus to be retrofittable into the transport vehicle and, by way of example, to control only functions and means of the transport vehicle in connection with the disclosed method.

An autonomous and/or semiautonomous vehicle (e.g. the disclosed autonomous and/or semiautonomous transport vehicle) is intended, by way of example, to be understood to mean a vehicle that is configured to move autonomously and/or at least in part autonomously. A vehicle is intended, by way of example, to be understood as moving at least in part autonomously if the vehicle moves (e.g. travels and/or flies and/or floats) over at least part of a predetermined route, and navigates along the predetermined route, independently (e.g. without the influence of a vehicle travelr/rider). An autonomously moving vehicle moves over the entire route independently (e.g. without the influence of a vehicle travelr/rider) and navigates along the entire route independently, for example.

The disclosed autonomous and/or semiautonomous transport vehicle is, by way of example, configured to move autonomously and/or at least in part autonomously. For example, the transport vehicle and/or means of the transport vehicle (e.g. the disclosed control apparatus) is configured to control the transport vehicle such that it moves at least in part autonomously along a predetermined route, for example moves (e.g. travels and/or flies and/or floats) over at least part of the predetermined route, and navigates (e.g. steers) along the predetermined route, independently (e.g. without the influence of a vehicle travelr/rider). Further, the autonomous and/or semiautonomous transport vehicle is configured to follow a leading unit (e.g. a leading vehicle traveling ahead) autonomously. For example, the autonomous and/or semiautonomous transport vehicle comprises suitable monitoring means for monitoring the surroundings of the area in front of and/or beside and/or behind and/or above and/or below the transport vehicle in order to be able to detect and independently travel around obstacles when the transport vehicle moves autonomously (i.e. independently), and/or in order to be able to follow a leading unit. Examples of such monitoring means are a laser scanner, an ultrasonic scanner, a camera and/or a radar system.

The transport vehicle is, by way of example, a land vehicle (e.g. a bicycle, a tricycle, a pedelec, an automobile, a truck, a rail vehicle such as a locomotive, an unmanned land vehicle and/or a robot) traveling at least in part autonomously, a watercraft (e.g. a ship such as a cargo ship, a submarine and/or an unmanned watercraft) traveling at least in part autonomously and/or an aircraft (e.g. an airplane, a helicopter, an unmanned aircraft such as a drone) flying at least in part autonomously. Preferably, the transport vehicle is an unmanned vehicle.

Obtaining pieces of information (e.g. the pieces of transport information and/or the pieces of transport convoy information) within the context of the disclosed method is intended, by way of example, to be understood to mean that the pieces of information are received on the control apparatus and/or on the transport vehicle (e.g. by communication means of the control apparatus and/or of the transport vehicle). For example, pieces of information can be received from the control apparatus and/or on the transport vehicle from a remote apparatus (e.g. a remote transport service apparatus) and/or a leading unit (e.g. a leading vehicle and/or a radio transmitter of the leading unit) of a transport convoy. Further, pieces of information (e.g. the transport information and/or the transport convoy information) can be obtained within the context of the disclosed method by means of a user input on the control apparatus and/or on the transport vehicle (e.g. by capturing a user input by user input means of the control apparatus and/or of the transport vehicle). A further example of how pieces of information (e.g. the pieces of transport information and/or the pieces of transport convoy information) can be obtained within the context of the disclosed method is specifying the pieces of information by the control apparatus and/or the transport vehicle (e.g. by means of the control apparatus and/or of the transport vehicle such as a processor), so that the pieces of information are obtained as the result of the specification.

The pieces of transport information for the transport order include and/or represent, by way of example, pieces of information associated with the transport order, such as, for example, an address statement, position statement and/or coordinate statement for the destination position associated with the transport order, an address statement, position statement and/or coordinate statement for the starting position associated with the transport order and/or pieces of shipment information (e.g. an identifier of the shipment, pieces of information pertaining to the weight and/or pertaining to the dimensions of the shipment, pieces of information pertaining to the sender and/or receiver of the shipment, a shipment collection time setting, a shipment collection period setting, a shipment delivery period setting and/or a shipment delivery time setting) associated with the shipment to be transported as part of the transport order. The pieces of transport information can be received from a remote apparatus, for example. Alternatively or additionally, the pieces of transport information can be specified, for example.

A shipment is, by way of example, a package, a piece good, a parcel shipment and/or a letter shipment. It goes without saying that a shipment can comprise or may be formed by a liquid, a gas or a loose good.

The transport order instructs the transport vehicle to transport a shipment from a starting position to a destination position, for example. A destination position associated with the transport order is intended, by way of example, to be understood to mean a position at which a shipment to be transported as part of the transport order is intended to be delivered; and a starting position associated with the transport order is intended, by way of example, to be understood to mean a position at which a shipment to be transported as part of the transport order is intended to be collected. The starting position corresponds to the postal address of the sender of the shipment, for example, and the destination position corresponds to the postal address of the recipient of the shipment, for example.

That the pieces of transport information for the transport order are intended to represent a destination position associated with the transport order is intended, by way of example, to be understood to mean that the pieces of transport information include and/or represent an address statement, position statement and/or coordinate statement for the destination position associated with the transport order. An address statement is, by way of example, a representation of a postal address (e.g. a postal address of a sender and/or recipient of a shipment). A coordinate statement is, by way of example, a representation of coordinates of a position such as a starting position and/or a destination position (e.g. coordinates of a position according to a satellite-assisted navigation system and/or a geographical coordinate system such as UTM (Universal Transverse Mercator) coordinate system on the basis of the geodetic reference system WGS84 (World Geodetic System 1984)).

A transport convoy comprises, by way of example, at least one leading unit. Optionally, a transport convoy can comprise one or more further vehicles (e.g. autonomous and/or semiautonomous transport vehicles) that follow the leading unit (e.g. autonomously and/or semiautonomously). The leading unit is a leading vehicle, for example. The leading vehicle is controlled manually by a vehicle travelr/rider, for example. Alternatively, the leading vehicle may also be an autonomous and/or semiautonomous vehicle, however. The leading vehicle can provide (e.g. send in the form of a radio signal) the vehicles that follow with pieces of follow information (such as pieces of speed-of-travel information and/or pieces of direction-of-travel information) that the vehicles that follow can use for autonomously and/or semiautonomously following the transport convoy. Further, the leading vehicle can receive pieces of information from one or more vehicles that follow, for example in order to be able to match its movement (e.g. direction of travel and/or speed of travel) to one or more of the vehicles that follow (for example to adapt the speed e.g. in the event of disturbances or when joining the transport convoy or when leaving the transport convoy). For example, the leading vehicle is a land vehicle (e.g. a bicycle, a tricycle, a pedelec, an automobile, a truck, a rail vehicle such as a locomotive, an unmanned land vehicle such as a robot), a watercraft (e.g. a ship such as a cargo ship, a submarine and/or an unmanned watercraft) and/or an aircraft (e.g. an airplane, a helicopter, an unmanned aircraft such as a drone). Alternatively, the leading unit may also be a human being (e.g. a postman and/or a delivery agent) and/or an animal, however.

The pieces of transport convoy information include and/or represent, for example, pieces of information associated with a transport convoy such as, by way of example, an identifier of the transport convoy, statements pertaining to the makeup of the transport convoy, statements pertaining to the maximum, minimum and/or average speed of the transport convoy and/or pieces of route information associated with the planned route of the transport convoy (e.g. pieces of information pertaining to the route profile and/or pieces of information pertaining to the speed profile). That the pieces of transport convoy information represent an identifier of a transport convoy is intended, by way of example, to be understood to mean that the pieces of transport convoy information include a representation of the identifier of the transport convoy. The information pertaining to makeup of the transport convoy may be dynamic, for example, and change when a vehicle joins the transport convoy (i.e. begins to follow the transport convoy) and/or a vehicle leaves the transport convoy. The pieces of transport convoy information can be received from a remote apparatus and/or a leading unit of the transport convoy, for example. Alternatively or additionally, the pieces of transport convoy information can be specified, for example.

The identifier of the transport convoy is intended, by way of example, to allow identification of the transport convoy. It is an explicit identifier and/or an identifier that is explicitly released in one region (e.g. the region in which the transport convoy is moving) and/or in one system (e.g. the disclosed system), for example, so that it allows explicit identification of the transport convoy.

A route is intended, by way of example, to be understood to mean a path description of a path between multiple positions. The path for the most part does not correspond to the linear distance or line of sight between these positions, but rather, for example, runs along transport routes such as land transport routes (e.g. roads, footpaths, rail routes), water transport routes (e.g. waterways such as navigable rivers and canals) and/or air transport routes (e.g. air routes). A route can be represented by an ordered list of waypoint statements, for example, each waypoint statement representing a position of a waypoint on a path at which the direction of the path changes.

A route can describe a path for a transport vehicle and/or a transport convoy, for example. In this case, a path for a transport vehicle and/or a transport convoy is intended, by way of example, to be understood to mean a path along which the transport vehicle and/or the transport convoy can move. Accordingly, a route is specified on the basis of the properties (e.g. the maximum permissible speed and/or external dimensions) of the transport vehicle and/or the transport convoy, for example.

The planned route of the transport convoy describes the path along which the transport convoy will move, for example. The planned route of the transport convoy is predetermined, for example.

The transport route between the current position of the transport vehicle and the destination position associated with the transport order is subsequently also referred to as the transport route for the transport vehicle. It describes, by way of example, a possible path along which the transport vehicle can move from the current position of the transport vehicle to the destination position associated with the transport order. It goes without saying that there may be a plurality of possible transport routes between the current position of the transport vehicle and the destination position associated with the transport order that describe different possible paths along which the transport vehicle can move from the current position of the transport vehicle to the destination position associated with the transport order. The transport route for the transport vehicle is specified, for example, and/or is selected from the plurality of possible transport routes.

The current position of the transport vehicle corresponds, by way of example, to a position at which the transport vehicle is located when the disclosed method is performed, and/or to a most recently captured position of the transport vehicle (e.g. a position most recently captured by position capture means of the control apparatus and/or of the transport vehicle).

A common route section is intended, by way of example, to be understood to mean a part of the planned route of the transport convoy and a part of the transport route for the transport vehicle that describe the same path. For example, the planned route of the transport convoy and the transport route for the transport vehicle are concordant in the common route section.

A surroundings parameter is intended, by way of example, to mean a surroundings property capturable on the control apparatus and/or the transport vehicle and/or by capture means (e.g. one or more sensors) of the control apparatus and/or of the transport vehicle. The surroundings property is, for example, a physical or chemical quantity and/or property capturable in surroundings of the control apparatus and/or of the transport vehicle. In this case, the surroundings of the control apparatus and/or of the transport vehicle may be defined by the capture area of the capture means.

The first surroundings parameter represents, by way of example, a first surroundings properties captured by capture means (e.g. one or more sensors). In particular, the first surroundings parameter represents, by way of example, a first surroundings property captured by capture means (e.g. one or more sensors) of the control apparatus and/or of the transport vehicle.

As the result of the capture of the first surroundings parameter, first surroundings parameter information is obtained that represents the captured first surroundings parameter (e.g. a captured value of a physical or chemical variable captured as first surroundings parameter).

Causing the capture of the first surroundings parameter is intended, by way of example, to be understood to mean that capture means (e.g. one or more sensors) are actuated by the control apparatus and/or the transport vehicle such that the capture means are caused to capture the first surroundings parameter. This is advantageous, for example, if the capture means are not part of the control apparatus and/or of the transport vehicle.

The first surroundings parameter is captured at the beginning and/or close to the beginning of the common route section, for example. In this case, the first surroundings parameter is intended, by way of example, to be understood as being captured at and/or close to the beginning of the common route section if it is captured by capture means at a position at a distance of less than 100 m, preferably less than 25 m, particularly preferably less than 10 m, from the beginning of the common route section, and/or if it is captured while the transport vehicle is autonomously and/or semiautonomously moving to the beginning of the common route section. This is advantageous, by way of example, if the position of the transport vehicle cannot be determined accurately. For example, the position of the transport vehicle can be captured with different accuracies by position capture means of the control apparatus and/or of the transport vehicle, in each case depending on the surroundings, so that, by way of example, it is only possible to determine that the transport vehicle is approaching the beginning of the common route section and/or is close to the beginning of the common route section.

The first surroundings parameter is captured continuously (e.g. at regular or irregular intervals of time), for example. Alternatively, the first surroundings parameter is, by way of example, captured (e.g. only) when the transport vehicle is at the beginning and/or close to the beginning of the common route section or when a defined (e.g. predetermined) transport convoy arrival time and/or transport convoy arrival period (e.g. the defined transport convoy arrival time corresponds to the expected arrival time of the transport convoy at the beginning of the common route section and/or the defined transport convoy arrival period corresponds to the period between the earliest and the latest expected arrival time of the transport convoy at the beginning of the common route section) is reached.

The beginning of the common route section corresponds, for example, to a position (e.g. a waypoint) at which the planned route of the transport convoy and the transport route for the transport vehicle meet (e.g. meet for the first time).

For example, there may be provision for the transport vehicle to autonomously and/or semiautonomously move to this position (i.e. at the beginning of the common route section) (e.g. to move to this position along the transport route for the transport vehicle) and/or to wait for the transport convoy at this position (i.e. at the beginning of the common route section).

The transport convoy is detected, for example, by determining whether the identifier of the transport convoy represented by the pieces of transport convoy information is represented by the captured first surroundings parameter and/or the first surroundings parameter information obtained as the result of the capture of the first surroundings parameter. This can be effected, by way of example, using a recognition algorithm such as an image recognition algorithm and/or a pattern recognition algorithm.

If the transport convoy is detected at least in part based on the captured first surroundings parameter and the obtained pieces of transport convoy information, the transport vehicle follows the transport convoy and/or the transport vehicle is caused to follow the transport convoy. In this case, following the transport convoy is intended, by way of example, to be understood to mean that the transport vehicle moves such that it follows the last vehicle in the transport convoy or another vehicle in the transport convoy (e.g. follows it at a predetermined distance) and therefore joins the transport convoy (e.g. gets in line between two vehicles in a transport convoy or behind the last vehicle in the transport convoy). For example, the transport vehicle moves along the same route as the transport convoy (e.g. along the common route section of the planned transport route of the transport convoy and the transport route for the transport vehicle) when it follows the transport convoy.

The control apparatus can, by way of example, cause the transport vehicle to follow the transport convoy by actuating the transport vehicle and/or means of the transport vehicle such that the transport vehicle is caused to follow the transport convoy.

If the transport vehicle follows the transport convoy, it is typically confronted by much less complex surroundings situations, since the direction of travel and speed of travel of the transport vehicle are predetermined by the transport convoy (i.e. primarily by the leading unit of the transport convoy) and the transport vehicle does not have to specify (e.g. compute) them. The transport vehicle can and must therefore, if it follows the transport convoy, rely on the transport vehicle or the vehicle travelr/rider of the transport vehicle analyzing the surroundings situation correctly and specifying an appropriately adapted direction of travel and speed of travel. So long as the transport vehicle follows a transport convoy, it can therefore move more quickly and/or also in areas with a complex surroundings situation.

This is, by way of example, advantageous in order to be able to move the transport vehicle also over longer distances or in areas in which complex surroundings situations frequently arise, for example by virtue of the transport vehicle following a transport convoy over longer route sections of the transport route and/or over route sections of the transport route in areas in which complex surroundings situations frequently arise. By way of example, the pieces of transport convoy information are specified accordingly.

Further advantages of the disclosed invention are described below on the basis of exemplary embodiments of the disclosed method, the disclosed control apparatus, the disclosed transport vehicle, the disclosed system and the disclosed computer program.

In one exemplary embodiment of the invention, the method further comprises:
capturing and/or causing the capture of a position of the transport vehicle.

The position is captured, by way of example, by a position capture means (e.g. position capture means of the control apparatus and/or of the transport vehicle). An example of such a position capture means is a position sensor, for example a position sensor of a satellite-assisted positioning system such as the GPS (Global Positioning System) system, the GLONASS system, the Galileo system and/or the Beidou system.

Alternatively or additionally, the position is captured at least in part by capturing communication signals according to a wireless communications technique at the position (e.g. using wireless communication means). For example, triangulation and/or trilateration for determining the position can be performed at least in part on the basis of the wireless communications signals capturable at the position, according to a wireless communications technique.

Alternatively or additionally, more accurate position determination and/or position plausibilization can be effected by means of a collation with navigation and/or map data (e.g. navigation and/or map data representing road maps, rail network plans, etc.). For example, the position of the transport vehicle can be captured at least in part based on pieces of movement information for the transport vehicle. For example, the pieces of movement information represent past (i.e. performed and/or captured) changes of direction and/or speed of the transport vehicle. For example, the control apparatus and/or the transport vehicle has one or more motion sensors (e.g. an acceleration sensor, a gyroscope and/or a speed sensor) that are configured to capture changes of direction and/or speed of the transport vehicle. Subsequently, for example by means of a collation with the transport route for the transport vehicle, the section of the transport route already covered by the transport vehicle can be determined and hence a position of the transport vehicle can be captured. Alternatively or additionally, the collation can also be performed with map and/or navigation data (e.g. navigation and/or map data representing road maps, rail network plans, etc.) and/or plausibilized using a position captured by position capture means.

Further, the position of the transport vehicle can be determined at least in part based on characteristic surroundings properties such as a characteristic landmark, house number, road name, etc. captured by suitable capture means of the control apparatus and/or of the transport vehicle.

The position is captured continuously (e.g. at regular or irregular intervals of time), for example.

The accuracy of the captured position may be different, in each case depending on the respective surroundings of the transport vehicle. For example, the accuracy of a captured position may be 5 m or 15 m or 50 m, to cite a few examples. As such, a position captured by a position sensor of a satellite-assisted navigation system in built-up areas and/or inside buildings, for example, may be more inaccurate than a position captured in undeveloped areas and/or outside buildings.

Causing the capture of a position of the transport vehicle is intended, by way of example, to be understood to mean that position and/or communication means (e.g. one or more sensors) are actuated by the control apparatus and/or the transport vehicle such that the position and/or communication means are caused to capture the position of the transport vehicle and/or to capture communication signals for determining the position of the transport vehicle. This is advantageous, for example, if the position and/or communication means are not part of the control apparatus and/or of the transport vehicle.

As the result of the capture of the position of the transport vehicle, position information is obtained, for example, that represents the captured position (e.g. in the form of a position statement and/or coordinate statement).

The captured position of the transport vehicle can, by way of example, be used for navigation along a predetermined route (e.g. the transport route for the transport vehicle), for example if the transport vehicle moves autonomously and/or semiautonomously.

In one exemplary embodiment of the invention, the method further comprises:

if the transport convoy is at the end and/or close to the end of the common route section, leaving the transport convoy in the transport vehicle and/or causing the transport vehicle to leave the transport convoy.

Leaving the transport convoy is intended, by way of example, to be understood to mean that the transport vehicle moves such that it does not follow (e.g. no longer follows) the vehicle traveling ahead in the transport convoy (e.g. the vehicle traveling directly ahead in the transport convoy and/or the vehicle in the transport convoy that the transport vehicle has followed (e.g. hitherto)). For example, the transport vehicle moves along a different route than the transport convoy if it leaves the transport convoy.

Further, the transport vehicle can provide the leading unit and/or other vehicles in the transport convoy with applicable pieces of information that the transport vehicle is leaving the transport convoy. The leading unit can use these pieces of information to update pieces of information (e.g. pieces of transport convoy information) representing and/or including the makeup of the transport convoy, for example. The other vehicles in the transport convoy can use these pieces of information to close a gap in the transport convoy that arises as a result of the transport vehicle leaving the transport convoy, for example (e.g. this information causes a vehicle that has followed the transport vehicle hitherto to now follow the vehicle that the transport vehicle has followed hitherto and/or to catch up with this vehicle).

The control apparatus can, by way of example, cause the transport vehicle to leave the transport convoy by actuating the transport vehicle and/or means of the transport vehicle such that the transport vehicle is caused to leave the transport convoy.

That the transport convoy is left at and/or close to the end of the common route section is intended, by way of example, to be understood to mean that the transport vehicle leaves the transport convoy at a position at a distance of less than 100 m, preferably less than 25 m, particularly preferably less than 10 m, from the end of the common route section. This is advantageous, by way of example, if the position of the transport vehicle cannot be determined accurately. As disclosed above, the position of the transport vehicle can be captured with different accuracies by position capture means of the control apparatus and/or of the transport vehicle, in each case depending on the surroundings.

The end of the common route section corresponds, for example, to a position (e.g. a waypoint) at which the planned route of the transport convoy and the transport route for the transport vehicle separate from one another (e.g. separate from one another for the first time).

For example, the planned route of the transport convoy and the transport route for the transport vehicle meet at the beginning of the common route section and separate at the end of the common route section. The beginning and end of the common route section correspond, by way of example, to positions (e.g. waypoints) that are situated both on the planned route of the transport convoy and on the transport route for the transport vehicle.

The method can further comprise:

autonomously and/or semiautonomously moving and/or causing the autonomous and/or semiautonomous movement of the transport vehicle to the destination position associated with the transport order.

For example, the autonomous and/or semiautonomous movement and/or the causing of the autonomous and/or semiautonomous movement of the transport vehicle to the destination position associated with the transport order can be effected when the transport vehicle has left the transport convoy. For example, the transport vehicle, when it has left the transport convoy, moves along (e.g. continuing along) the transport route for the transport vehicle to the destination position associated with the transport order.

Optionally, the method can further comprise:

capturing and/or causing the capture of a second surroundings parameter;

detecting the destination position at least in part based on the captured second surroundings parameter, wherein the transport vehicle autonomously and/or semiautonomously moves to the detected destination position and/or the autonomous and/or semiautonomous movement of the transport vehicle to the detected destination position is caused.

The second surroundings parameter represents, by way of example, a second surroundings properties captured by capture means (e.g. one or more sensors). In particular, the second surroundings parameter represents, by way of example, a second surroundings property captured by capture means (e.g. one or more sensors) of the control apparatus and/or of the transport vehicle. The first and second surroundings parameters can be captured by the same or by different capture means, for example.

The result obtained for the capture of the second surroundings parameter is, by way of example, second surroundings parameter information that represents the captured second surroundings parameter (e.g. a captured value of a physical or chemical variable captured as second surroundings parameter).

Causing the capture of the second surroundings parameter is intended, by way of example, to be understood to mean the capture means (e.g. one or more sensors) are actuated by the control apparatus and/or the transport vehicle such that the capture means are caused to capture the second surroundings parameter. This is advantageous, for example, if the capture means are not part of the control apparatus and/or of the transport vehicle.

The second surroundings parameter is intended, by way of example, to be understood as being at and/or close to the destination position associated with the transport order. In this case, the second surroundings parameter is intended, for example, to be understood as being captured at and/or close to the destination position if it is captured by capture means at a position at a distance of less than 100 m, preferably less than 25 m, particularly preferably less than 10 m, from the destination position and/or if it is captured by capture means after the transport vehicle has left the transport convoy. This is advantageous, by way of example, if the position of the transport vehicle cannot be determined accurately.

The second surroundings parameter is captured continuously (e.g. at regular or irregular intervals of time), for example. Alternatively, the first surroundings parameter is captured, by way of example, (e.g. only) when the transport vehicle is at and/or close to the destination position associated with the transport order and/or when a defined (e.g. predetermined) shipment delivery time and/or shipment delivery period (e.g. the defined shipment delivery time corresponds to the expected and/or predetermined time of the delivery of the shipment at the destination position and/or the defined shipment delivery period is the period between an earliest time and a latest times between which a delivery of the shipment at the destination position is expected and/or predetermined) is reached.

The destination position is detected, for example, by determining whether the captured second surroundings parameter represents a surroundings property that is characteristic of the destination position.

For example, the destination position can be detected by means of a characteristic landmark (e.g. a building) represented by the second surroundings parameter (e.g. an image of the surroundings that is captured by optical capture means (e.g. an optical sensor)). For example, this characteristic landmark is represented by the pieces of transport information. Accordingly, the second surroundings parameter can be captured by capturing an image of surroundings of the transport vehicle. The image is captured by an image sensor and/or a video and/or still camera of the control apparatus and/or of the transport vehicle, for example. Subsequently, a pattern recognition algorithm and/or image recognition algorithm can be applied to the captured image, for example, in order to determine whether the characteristic landmark of the destination position is included therein and/or represented thereby.

Alternatively or additionally, the transport information can represent an identifier of the destination position, wherein the destination position is detected at least in part based on the captured second surroundings parameter if the captured second surroundings parameter includes a representation of the identifier of the destination position (i.e. a surroundings property that is characteristic of the destination position).

The identifier of the destination position is intended, by way of example, to allow identification of the destination position. It is, by way of example, an explicit identifier and/or an identifier that is explicit at least in one region (e.g. the region in which the destination position is located) and/or in one system (e.g. the disclosed system), so that it allows explicit identification of the destination position.

The identifier of the destination position is, by way of example, a wirelessly capturable identifier, in particular an optical identifier and/or a radio signal identifier.

An optical identifier is intended, by way of example, to be understood to mean an optically capturable identifier. Examples of an optical identifier are a pattern (e.g. a QR code and/or a barcode) and/or a character string and/or digit sequence.

For example, an optical identifier of this kind is located at and/or close to the destination position.

If the identifier of the destination position is an optical identifier, the second surroundings parameter is captured by optical capture means (e.g. an optical sensor), for example. Optical capture means of this kind are, for example, light-sensitive components such as an image sensor, a CCD (charge coupled device) sensor, an APS (active pixel sensor) sensor and/or a photoresistor. Further, optical data capture devices such as a digital video and/or still camera and/or a barcode reader can also be understood as an optical capture means.

For example, the second surroundings parameter is a representation of optically capturable surroundings of the control apparatus and/or of the transport vehicle. An example of such a representation is an image that represents a depiction (e.g. a two- or three-dimensional depiction and/or a graphical depiction) of surroundings of the transport vehicle. Accordingly, the second surroundings parameter can be captured by capturing an image of surroundings of the transport vehicle. The image is captured by an image sensor and/or a video and/or still camera of the control apparatus and/or of the transport vehicle, for example. Subsequently, a pattern recognition algorithm and/or image recognition algorithm can be applied to the captured image, for example, in order to determine whether the identifier of the destination position is included therein and/or represented thereby.

Further, the direction in which the identifier is located can be determined, for example. The result obtained for the determination is, by way of example, direction information that represents the direction in which the identifier is located. If the identifier is at the destination position, this direction information can be taken as a basis for determining, by way of example, a direction of travel of the transport vehicle in the direction of the destination position, for example in order to allow autonomous and/or semiautonomous movement of the transport vehicle in the direction of the destination position. This allows accurate navigation of the transport vehicle to the destination position even if only inadequate capture of a position of the transport vehicle by a position capture means is possible.

A radio signal identifier is intended, by way of example, to be understood to mean an identifier transmittable in a radio signal and/or representable by a radio signal. Examples of a radio signal identifier are an address (e.g. an MAC (Media Access Control) address and/or an IP (Internet Protocol) address), a name (e.g. a network name) and/or an identifier such as an SSID (Service Set Identification) and/or a BSSID (Basic Service Set Identification). It goes without saying that the radio signal identifier can also be transmitted in another kind of radio signal (e.g. a proprietary radio signal).

For example, at and/or close to the destination position there is a radio transmitter that is configured to transmit a radio signal that includes and/or represents such a radio signal identifier. The radio signal is transmitted automatically and/or continuously (e.g. at regular and/or irregular intervals of time), for example, by the radio transmitter. Alternatively or additionally, the transmission of the radio signal is effected in response to an applicable request (e.g. transmitted by communication means of the control apparatus and/or the transport vehicle), for example. The radio signal identifier is, by way of example, an address, a name and/or an identifier of the radio transmitter. An example of such a radio transmitter is a Bluetooth beacon and/or a WLAN access point, for example. If further radio transmitters are within the radio range of the radio transmitter at and/or close to the destination position, the different radio transmitters can coordinate their radio transmission frequencies and/or radio transmission timeslots for the sending of the respective radio signals via the different radio transmitters such that radio signal superimpositions and/or perturbations are avoided.

If the identifier is a radio signal identifier, the second surroundings parameter is received by radio communication and/or radio reception means (e.g. a radio interface), for example. Accordingly, the second surroundings parameter can be captured by receiving a radio signal in radio communication and/or radio reception means (e.g. a radio interface) of the control apparatus and/or of the transport vehicle.

For example, the second surroundings parameter is a representation of an identifier included in a received radio signal and/or of an identifier represented by a received radio signal. For example, the identifier included in a received radio signal and/or represented thereby can be extracted from the radio signal and subsequently compared with the identifier of the destination position in order to determine whether the identifier of the destination position is included therein and/or represented thereby.

Further, the direction of reception and/or the direction of propagation of the radio signal can be determined, for example. The result obtained for the determination is, by way of example, direction information that represents the direction of reception and/or the direction of propagation of the radio signal. If the radio transmitter is at the destination position, this direction information can be taken as a basis for determining, by way of example, a direction of travel of the transport vehicle in the direction of the destination position, for example in order to allow autonomous and/or semiautonomous movement of the transport vehicle in the direction of the destination position. This allows accurate navigation of the transport vehicle to the destination position even if only inaccurate capture of a position of the transport vehicle by position capture means is possible. It goes without saying that the transport convoy can be left and/or the destination position can be detected alternatively or additionally at least in part based on a captured position of the transport vehicle and route and/or map data (e.g. navigation and/or map data representing road maps, rail network plans, etc.). As disclosed above, the position can be captured at least in part based on pieces of movement information of the transport vehicle, for example. For example, the pieces of movement information represent past (i.e. performed and/or captured) changes of direction and/or speed of the transport vehicle. For example, the control apparatus and/or the transport vehicle has one or more motion sensors (e.g. an acceleration sensor, a gyroscope and/or a speed sensor) that are configured to capture changes of direction and/or speed of the transport vehicle. Subsequently, for example by means of a collation with the transport route for the transport vehicle, the section of the transport route already covered by the transport vehicle can be determined and hence also a position of the transport vehicle can be determined. If this reveals that the transport vehicle is at the end and/or close to the end of the common route section, the transport vehicle leaves the transport convoy, for example, and/or the transport vehicle is caused to leave the transport convoy. Subsequently, the transport vehicle can autonomously and/or semiautonomously move to the destination position (e.g. based on map and/or navigation data). Further, the position of the transport vehicle and hence the navigation to the destination position can be determined at least in part based on characteristic surroundings properties such as a characteristic landmark, house number, road names, etc. captured by suitable capture means of the control apparatus and/or of the transport vehicle.

In one exemplary embodiment of the invention, the transport convoy is detected at least in part based on the captured first surroundings parameter if the captured first surroundings parameter includes a representation of the identifier of the transport convoy.

For example, the identifier of the transport convoy is a wirelessly capturable identifier, in particular an optical identifier and/or a radio signal identifier. As disclosed above, an optical identifier is intended, by way of example, to be understood to mean an optically capturable identifier.

For example, an optical identifier is located at and/or on the leading unit of the transport convoy. For example, an optical identifier is located at and/or on each vehicle in the transport convoy. Accordingly, an optical identifier of the transport convoy is also intended to be understood to mean an optical identifier of the leading unit and/or of a vehicle of the transport convoy.

Further, a combination of the optical identifier of the leading unit and/or of the identifier(s) of one or more further vehicles in the transport convoy is also intended to be understood to mean the identifier of the transport convoy. In this case, the identifier of the transport convoy represents inferences about the makeup of the transport convoy, for example, and changes if the makeup changes. Further, it is also possible to deduce the utilization level (e.g. the capacity utilization level) of the transport convoy in this case. It goes without saying that pieces of information that represent a change in the makeup and/or in the identifier of the transport convoy can be provided (e.g. by the transport convoys and/or the leading unit of the transport convoy) (e.g. sent to a remote apparatus such as the transport service apparatus and/or the transport vehicle).

If the identifier of the transport convoy is an optical identifier, the first surroundings parameter is captured by optical capture means (e.g. an optical sensor), for example. Accordingly, the first surroundings parameter can be captured by capturing an image of surroundings of the transport vehicle. The image is captured by an image sensor and/or a video and/or still camera of the control apparatus and/or of the transport vehicle, for example.

As likewise disclosed above, a radio signal identifier is intended, by way of example, to be understood to mean an identifier transmittable in a radio signal and/or representable by a radio signal. For example, the leading unit and/or at least one other vehicle of the transport convoy has a radio transmitter that is configured to transmit a radio signal that includes and/or represents such a radio signal identifier. The radio signal identifier is then an address, a name and/or an identifier of this radio transmitter, for example. Accordingly, a radio signal identifier of the transport convoy is also intended to be understood to mean a radio signal identifier of a radio transmitter of the leading unit and/or of a vehicle of the transport convoy.

If the identifier is a radio signal identifier, the first surroundings parameter is received by radio communication and/or radio reception means (e.g. a radio interface), for example. Accordingly, the first surroundings parameter can be captured by receiving a radio signal in radio communication and/or radio reception means (e.g. a radio interface) of the control apparatus and/or of the transport vehicle. For example, the first surroundings parameter is a representation of an identifier included in a received radio signal and/or represented by a received radio signal.

In one exemplary embodiment of the invention, the method further comprises:
  specifying and/or causing the specification of the transport route between the current position of the transport vehicle and the destination position associated with the transport order.

The transport route for the transport vehicle and/or the plurality of possible transport routes can be specified at least in part based on navigation and/or map data, for example. As disclosed above, the transport route for the transport vehicle (i.e. the transport route between the current position of the transport vehicle and the destination position associated with the transport order) can be selected from a plurality of possible transport routes, for example. The selection can be made, by way of example, on the basis of one or more predetermined route criteria (e.g. fastest route, shortest route, expected route capacity bottlenecks and/or one or more further intermediate destination positions). Further, the selection can also take into consideration whether the transport route has (in particular over long route sections of the transport route and/or over route sections of the transport route in areas in which complex surroundings situations frequently arise), common route sections with planned routes of one or more transport convoys.

The result obtained for the specification of the transport route is, by way of example, pieces of transport route information that represent the transport route for the transport vehicle. As disclosed above, a route can be understood as a path description of a path between multiple positions and, by way of example, can be represented by an ordered list of waypoint statements, each waypoint statement representing a position of a waypoint on the path at which the direction of the path changes.

Causing the specification of the transport route for the transport vehicle is intended, by way of example, to be understood to mean that a request for specifying the transport route for the transport vehicle is sent to a remote apparatus (e.g. a remote server such as a navigation server and/or a transport service apparatus) in order to cause the remote apparatus to specify the transport route for the transport vehicle. Subsequently, applicable pieces of transport route information can be received from the remote apparatus.

In one exemplary embodiment of the invention, the obtaining of the pieces of transport convoy information comprises:

specifying the pieces of transport convoy information at least in part based on the transport route for the transport vehicle and/or multiple possible transport routes for the transport vehicle.

For example, the pieces of transport convoy information are obtained as the result of the determination of the pieces of transport convoy information at least in part based on the transport route for the transport vehicle.

The pieces of transport convoy information can be determined, by way of example, by virtue of the transport route for the transport vehicle (and/or multiple possible transport routes for the transport vehicle) being compared with the routes planned for one or more transport convoys. For example, the pieces of transport convoy information represent the identifier(s) of the transport convoys for which the comparison reveals that the planned routes of said transport convoys have in each case a common route section with the transport route for the transport vehicle. Pieces of route information that represent the planned routes of the transport convoys are captured by the control apparatus and/or the transport vehicle (e.g. stored in the form of a database in a memory of the control apparatus and/or the transport vehicle), for example. In this case, the pieces of transport convoy information are further determined at least in part based on such pieces of route information kept by the transport vehicle and/or the control apparatus.

Alternatively, it is possible, by way of example, for pieces of route information representing at least the planned route of a transport convoy to be received by the control apparatus and/or the transport vehicle (e.g. by communication means of the control apparatus and/or of the transport vehicle). For example, the leading unit and/or at least one other vehicle of the transport convoy has a radio transmitter that is configured to transmit a radio signal that includes and/or represents such pieces of route information and, by way of example, a radio signal identifier of the transport convoy. If the transport vehicle is in the reception range of the transport convoy, it can receive the radio signal, and can compare the transport route for the transport vehicle (and/or multiple possible transport routes for the transport vehicle) with the route planned for the transport convoy that is represented by the pieces of route information. If the planned route of the transport convoy has a common route section with the transport route for the transport vehicle (and/or at least one of the multiple possible transport routes for the transport vehicle), the result obtained is, by way of example, pieces of transport convoy information that represents the radio signal identifier of this transport convoy.

This embodiment allows local coordination of transport convoys, transport orders and transport routes for transport vehicles. This is advantageous, by way of example, if the transport convoys, transport orders and transport vehicles are planned and/or arranged between different transport services.

In an alternative exemplary embodiment of the invention, the obtaining of the pieces of transport convoy information comprises:

receiving the pieces of transport convoy information from a remote apparatus.

For example, the pieces of transport convoy information are specified by the remote apparatus (e.g. a transport service apparatus). The specifying of the pieces of transport convoy information by the remote apparatus can be caused by the control apparatus and/or the transport vehicle, for example, by virtue of a request for specifying the pieces of transport convoy information being sent to the remote apparatus in order to cause the remote apparatus to specify the pieces of transport convoy information. Subsequently, applicable pieces of transport convoy information can be received from the remote apparatus.

Optionally, it is further possible, as disclosed above, for pieces of transport route information representing the transport route for the transport vehicle to be received from the remote apparatus.

The pieces of transport convoy information and/or the pieces of transport route information can be received by communication means of the control apparatus and/or of the transport vehicle, for example.

This embodiment allows central coordination of transport convoys, transport orders and transport routes for transport vehicles. This is advantageous, by way of example, if the transport convoys, transport orders and transport vehicles are planned and/or arranged by one transport service.

BRIEF DESCRIPTION OF THE DRAWINGS

Further advantageous exemplary configurations of the invention can be taken from the following detailed description of some exemplary embodiments of the present invention, in particular in conjunction with the figures. The figures accompanying the application are intended to be used only for the purposes of clarification, however, rather than for determining the scope of protection of the invention. The accompanying drawings are not necessarily to scale and are merely intended to reflect the general concept of the present invention by way of example. In particular, features included in the figures are by no means intended to be deemed an absolutely necessary part of the present invention.

In the drawings.

DETAILED DESCRIPTION OF THE INVENTION

Figure 1:
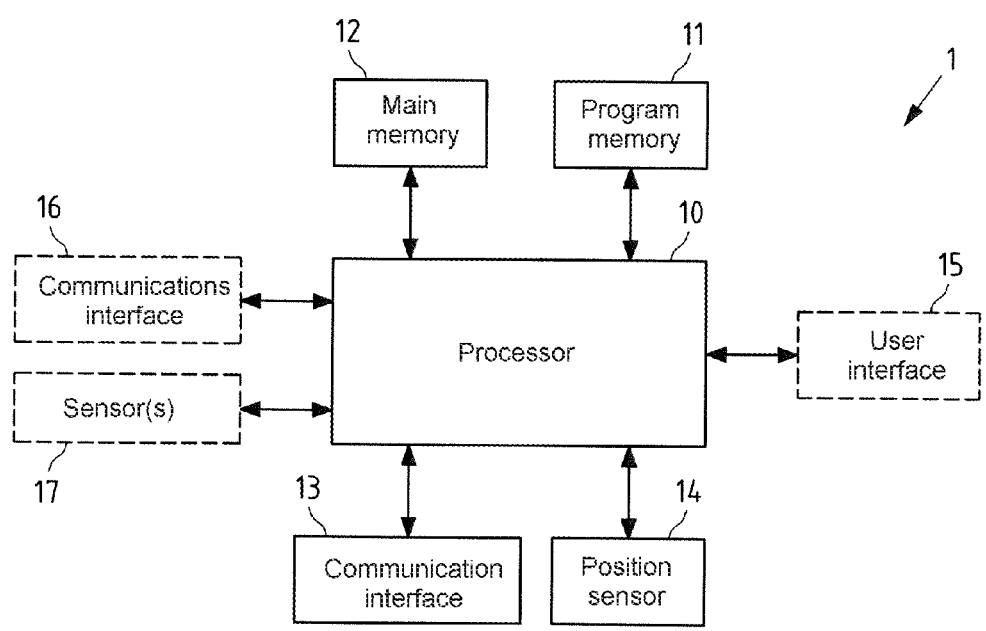
FIG. 1 shows a schematic depiction of an embodiment of a control apparatus according to an exemplary aspect of the invention.

FIG. 1 is a schematic depiction of an exemplary embodiment of a control apparatus 1 according to an exemplary aspect of the invention.

The control apparatus 1 comprises, by way of example, a processor 10 and, connected to the processor 10, a first memory as a program and data memory 11, a second memory as a main memory 12, a first wireless communication interface 13, a position sensor 14 and an optional user interface 15. Further, the apparatus 1 can optionally hold a second wireless communication interface 16 and/or one or more sensors 17.

A processor is intended, by way of example, to be understood to mean a microprocessor, a microcontrol unit, a microcontroller, a digital signal processor (DSP), an application-specific integrated circuit (ASIC) or a field programmable gate array (FPGA). It goes without saying that the apparatus 1 can also comprise multiple processors 10.

Processor 10 executes program instructions stored in program memory 11 and stores, by way of example, intermediate results or the like in main memory 12. The program memory 11 includes, by way of example, program instructions of a disclosed computer program comprising program instructions that cause the processor 10 to perform and/or control a disclosed method (e.g. the method according to the flowchart 300 depicted in FIG. 3) when the processor 10 executes these program instructions stored in program memory 11. Moreover, program memory 11 may store a transport convoy database and/or map and/or navigation data, for example.

Program memory 11 further includes, by way of example, the operating system of the control apparatus 1, which is loaded at least in part into main memory 12 and executed by the processor 10 when the control apparatus 1 is started. In particular, at least part of the core of the operating system is loaded into the main memory 12 and executed by processor 10 when the control apparatus 1 is started.

An example of an operating system is a Windows, UNIX, Linux, Android, Apple iOS and/or MAC OS operating system. The operating system allows in particular the use of the control apparatus for data processing. By way of example, it manages resources such as a main memory and a program memory, uses programming interfaces, inter alia, to make basic functions available to other computer programs and controls the execution of computer programs.

A program memory is, by way of example, a nonvolatile memory such as a flash memory, a magnetic memory, an EEPROM (electrically erasable programmable read-only memory) store and/or an optical memory. A main memory is, for example, a volatile or nonvolatile memory, in particular a random access memory (RAM) such as a static RAM (SRAM) store, a dynamic RAM (DRAM) store, a ferroelectric RAM (FeRAM) store and/or a magnetic RAM (MRAM) store.

Main memory 12 and program memory 11 may also be configured as one memory. Alternatively, main memory 12 and/or program memory 11 may each be formed by multiple memories. Further, main memory 12 and/or program memory 11 may also be part of the processor 10.

Processor 10 controls the first wireless communication interface 13, which is configured as a Bluetooth interface, for example.

A wireless communication interface can, by way of example, receive pieces of information (via a wireless communication path) and forward them to the processor and/or receive pieces of information from the processor and send them (via a wireless communication path). An example of a wireless communication interface is a wireless network adapter. For example, a wireless communication interface comprises not only an antenna but also at least a transmitter circuit and a receiver circuit or a transceiver circuit.

Figure 2:
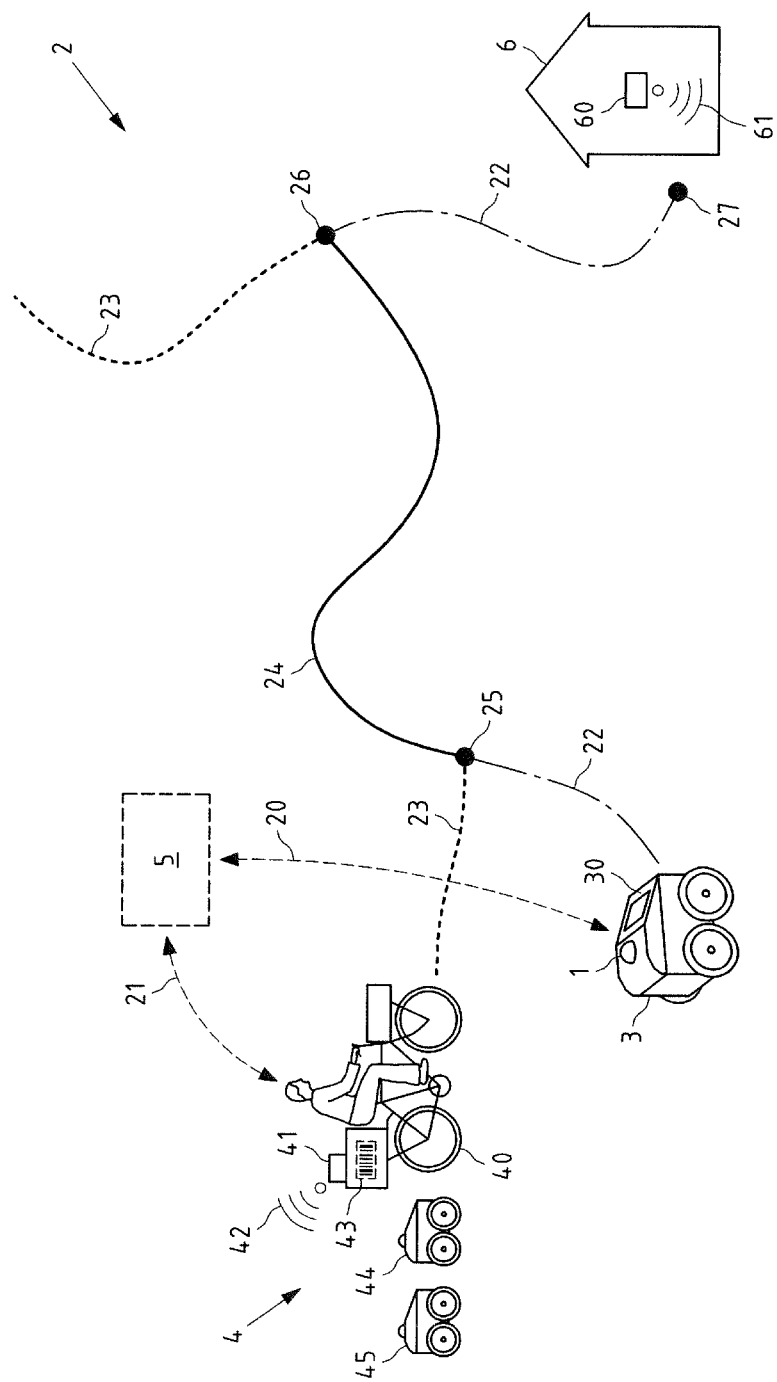
FIG. 2 shows a schematic depiction of an embodiment of a system according to an exemplary aspect of the invention.

The wireless communication interface 13 is, by way of example, configured to receive a radio signal (e.g. a Bluetooth signal from the Bluetooth beacons 41 and 61 depicted in FIG. 2).

Position sensor 14 is, by way of example, configured to capture a position of the control apparatus 1. For example, position sensor 14 is a position sensor of a satellite-assisted positioning system such as the GPS system, the GLONASS system, the Galileo system and/or the Beidou system. Position sensor 14 is also controlled by a processor 10.

Further, processor 10 controls the optional user interface 15, which is configured to output pieces of information to a user and/or to capture inputs from a user. As disclosed above, a user interface may be a keyboard, a mouse, a screen, a touch sensitive screen, a loudspeaker, a microphone, etc.

The optional second wireless network interface 16 is likewise controlled by a processor 10 and is configured as a GSM, UMTS and/or LTE interface, for example. It is configured to communicate with a server (e.g. the server 5 depicted in FIG. 3 for a transport service) via a wireless communication network (a GSM, UMTS and/or LTE network), for example.

Furthermore, processor 10 controls an optional sensor 17, for example an image sensor 17. An example of an image sensor 17 is an APS sensor or a CCD sensor. It may be configured to capture an image of surroundings of the control apparatus 1, for example.

It goes without saying that the control apparatus 1 can also comprise multiple optional sensors 17.

The components 10 to 17 in the control apparatus 1 are communicatively and/or operatively connected to one another via one or more bus systems (e.g. one or more serial and/or parallel bus connections), for example.

It goes without saying that the control apparatus 1 can comprise further components (e.g. a vehicle interface) besides the components 10 to 17. For example, a laser scanner, an ultrasonic sensor and/or a radar sensor for monitoring and/or controlling the travel functions of the transport vehicle may be incorporated.

FIG. 2 shows a schematic depiction of an embodiment of a system 2 according to an exemplary aspect of the invention.

FIG. 2 depicts the control apparatus 1 disclosed in connection with FIG. 1 as part of an unmanned land vehicle 3 by way of example. The unmanned land vehicle 3 is an autonomous and/or semiautonomous transport vehicle and has a receiving compartment 30 sealed by a door. The receiving compartment 30 can be used by the unmanned land vehicle 3 to transport a shipment (or possibly multiple shipments). It goes without saying that the transport vehicle 3 could also comprise multiple receiving compartments. As disclosed above, a vehicle is intended, by way of example, to be understood as moving at least in part autonomously if the vehicle is configured to move (e.g. travel) over at least part of a predetermined route, and to navigate along the predetermined route, independently (e.g. without the influence of a vehicle travelr/rider). An autonomously moving vehicle travels over the whole route independently (e.g. without the influence of a vehicle travelr/rider) and navigates along the whole route independently, for example. Further, the unmanned land vehicle 3 is configured to follow a vehicle traveling ahead autonomously. For example, the transport vehicle 3 comprises suitable monitoring means for monitoring the surroundings of the area in front of and/or beside the transport vehicle, in order to be able to detect and independently travel around obstacles when the transport vehicle moves independently, and/or in order to be able to follow a vehicle traveling ahead. Examples of such monitoring means are a laser scanner, an ultrasonic scanner, a camera and/or a radar system.

Besides the unmanned land vehicle 3 with the control apparatus 1, system 2 further comprises a transport convoy 4 having a leading unit 40, which is depicted as a cargo bicycle 40 in FIG. 2 by way of example. It goes without saying that the leading unit may also be another land vehicle (e.g. a tricycle, a pedelec, an automobile, a truck, a rail vehicle such as a locomotive, an unmanned land vehicle such as a robot), a watercraft (e.g. a ship such as a cargo ship, a submarine and/or an unmanned watercraft) and/or an aircraft (e.g. an airplane, a helicopter, an unmanned aircraft such as a drone). Alternatively, the leading unit may also be a human being (e.g. a postman and/or a delivery agent) and/or an animal, however.

The cargo bicycle 40 has a radio transmitter 41 that is configured to transmit a radio signal 42 that includes and/or represents a radio signal identifier. An example of such a radio transmitter is a Bluetooth beacon and/or a WLAN access point. It is subsequently assumed by way of example that the radio transmitter 41 is a Bluetooth beacon 41. Accordingly, the radio signal 42 is a Bluetooth signal 42 (e.g. what is known as an advertising signal). The Bluetooth signal 42 includes and/or represents a radio signal identifier in the form of an identifier of the Bluetooth beacon 41, for example, such as an MAC address of the Bluetooth beacon 41. The identifier of the Bluetooth beacon 41 is explicit, at least in the system 2, and therefore allows explicit identification of the cargo bicycle 40 (e.g. by virtue of the cargo bicycle 40 being appropriately linked to the Bluetooth beacon 41 and/or to the identifier of the Bluetooth beacon 41). The radio signal 42 is transmitted by the Bluetooth beacon 41 automatically and/or continuously (e.g. at regular and/or irregular intervals of time), for example.

Alternatively or additionally, the cargo bicycle 40 can also have an optical identifier 43.

Besides the cargo bicycle 40 as leading unit, the transport convoy 4 can comprise vehicles 44 and 45 following the cargo bicycle 40. Besides the radio signal identifier, the radio signal 42 can include and/or represent pieces of follow information (such as pieces of speed travel information and/or pieces of direction of travel information), for example, that the vehicles 44 and 45 that follow can use to autonomously and/or semiautonomously follow the transport convoy 4. Further, the vehicles that follow can optionally send pieces of information to the leading vehicle. These pieces of information can relate to the joining of the transport convoy, the leaving of the transport convoy and/or disturbances in the transport convoy, for example. These pieces of information can influence the movement (e.g. direction of travel and/or speed of travel) of the leading vehicle. It goes without saying that the transport convoy 4 can comprise further vehicles and that the system 2 can comprise further transport convoys.

Moreover, FIG. 2 depicts an optional transport service apparatus of a transport service as server 5. A transport service is a delivery service, a postal service, a parcel service and/or a courier service, for example.

The server 5 plans and/or arranges transport orders of the transport service, routes for transport convoys of the transport service and/or transport routes for transport vehicles of the transport service, for example. For this purpose, the server 5 can also employ and/or control a plurality or leading units such as the cargo bicycle 40 and/or a plurality of unmanned transport vehicles such as the transport vehicle 3.

FIG. 2 depicts optional communication connections 20 and 21. Communication connection 20 can be used by a server 5 to communicate with the unmanned transport vehicle 3, for example; and communication connection 21 can be used by a server 5 to communicate with cargo bicycle 40 and/or with a mobile user terminal (e.g. a smartphone) of the rider of the cargo bicycle 40, for example. The communication connections 20 and 21 are wireless communication connections via a mobile radio network (e.g. a GSM, UMTS and/or LTE network), for example, or encompass one or more wireless communication connections via a mobile radio network of this kind.

The embodiment of the system 2 with the server 5 allows central planning and arrangement. This embodiment is advantageous, by way of example, if transport orders, routes for transport convoys and/or transport routes for transport vehicles of the same transport service are intended to be planned and arranged.

Alternatively, however, embodiments of the system 2 without such a transport service apparatus are also possible. In these embodiments, the transport orders, routes for transport convoys and/or transport routes for transport vehicles are arranged and/or planned locally. These embodiments are advantageous, by way of example, if transport orders, routes for transport convoys and/or transport routes for transport vehicles for different transport services are intended to be planned and arranged and coordinated among one another. By way of example, in such embodiments, transport orders and/or free spaces in transport convoys can be provided via one or different network platforms (e.g. one or different network platforms provided by one or more servers (e.g. multiple servers forming a cloud)).

The starting point below is, by way of example, the embodiment depicted in FIG. 2 for the system 2 with the server 5.

FIG. 2 schematically depicts a transport route 22 for the unmanned transport vehicle 3 and a planned route 23 of the transport convoy 4. The transport route 22 for the transport vehicle 3 runs between the current position of the transport vehicle 3 and a destination position 27 associated with the transport order of the transport vehicle 3. The transport route 22 for the transport vehicle 3 and the planned route 23 of the transport convoy 4 have a common route section 24. This common route section 24 begins at the position 25 and ends at the position 26.

Further, FIG. 2 depicts a building 6 at the destination position 27, on which radio transmitter 60 is arranged. It is subsequently assumed by way of example that the radio transmitter 60 is a Bluetooth beacon 60 that is configured to transmit a Bluetooth signal 61 (e.g. what is known as an advertising signal). The Bluetooth signal 61 includes and/or represents a radio signal identifier in the form of an identifier of the Bluetooth beacon 60, for example, such as an MAC address of the Bluetooth beacon 60. The identifier of the Bluetooth beacon 60 is explicit, at least in the system 2, and therefore allows explicit identification of the destination position 27 (e.g. by virtue of the destination position 27 being appropriately linked to the Bluetooth beacon 60 and/or to the identifier of the Bluetooth beacon 60). The Bluetooth signal 61 is transmitted by the Bluetooth beacon 60 automatically and/or continuously (e.g. at regular and/or irregular intervals of time), for example.

Figure 3:
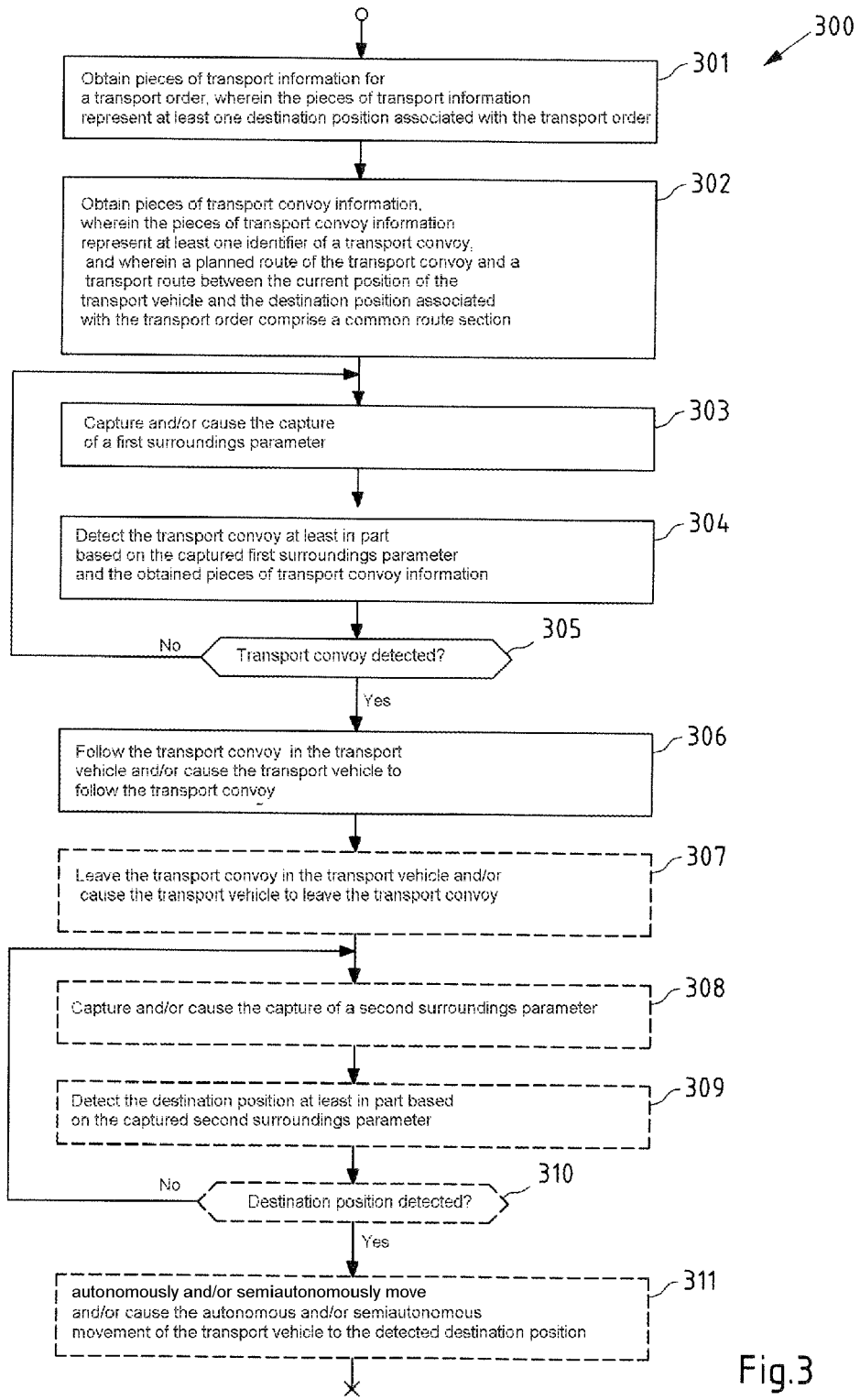
FIG. 3 shows a flowchart for an exemplary embodiment of a method according to an exemplary aspect of the invention.

FIG. 3 shows a flowchart with steps of an exemplary embodiment of a method according to an exemplary aspect of the invention. It is subsequently assumed by way of example that steps 301 to 311 of the flowchart 300 are performed by the control apparatus 1, which is part of the unmanned transport vehicle 3 in system 2 (cf. FIG. 2).

In a step 301, pieces of transport information are obtained for a transport order, the pieces of transport information representing at least one destination position associated with the transport order.

The pieces of transport information are received (i.e. obtained) by the communication interface 16 of the control apparatus 1 in step 301, for example from the server 5, via the communication connection 20.

The transport order instructs the transport vehicle 3 to transport a shipment (e.g. in the receiving compartment 30) from a starting position to a destination position, for example. A destination position associated with the transport order is intended, by way of example, to be understood to mean a position at which a shipment to be transported as part of the transport order is intended to be delivered; and a starting position associated with the transport order is intended, by way of example, to be understood to mean a position at which a shipment to be transported as part of the transport order is intended to be collected. The starting position corresponds to the postal address of the sender of the shipment, for example, and the destination position corresponds to the postal address of the recipient of the shipment, for example. Further, the transport order can also predetermine a shipment collection time and/or a shipment collection period and/or a shipment delivery time and/or a shipment delivery period. In this case, the shipment collection time can predetermine the exact time at which the shipment is intended to be collected at the starting position by the transport vehicle, for example; and the shipment collection period is predetermined by the earliest and latest time between which the shipment is intended to be collected at the starting position by the transport vehicle, for example. Accordingly, the shipment delivery time predetermines the exact time at which the shipment is intended to be delivered at the destination position by the transport vehicle, for example; and the shipment delivery period is predetermined by the earliest and the latest time between which the shipment is intended to be delivered at the destination position by the transport vehicle, for example. For example, the shipment to be transported is placed into the receiving compartment 30 of the transport vehicle 3 at the starting position by the sender and removed from the receiving compartment 30 of the transport vehicle 3 at the destination position by the recipient. It goes without saying that there may alternatively be provision for automatic unloading and/or loading of the transport vehicle 3 with the shipment. It is also possible for the transport vehicle 3 to transport multiple shipments at the same time.

The destination position associated with the transport order is the destination position 27, for example. By way of example, the pieces of transport information include a representation of the destination position in the form of an address statement, position statement and/or coordinate statement. Further, the pieces of transport information can include and/or represent further pieces of information associated with the transport order, such as, for example, an address statement, position statement and/or coordinate statement for the starting position associated with the transport order and/or pieces of shipment information (e.g. an identifier of the shipment, pieces of information pertaining to the weight and/or pertaining to the dimensions of the shipment, pieces of information pertaining to the sender and/or receiver of the shipment) associated with the shipment to be transported as part of the transport order.

In a step 302, pieces of transport convoy information are obtained, the pieces of transport convoy information representing at least one identifier of a transport convoy. In this case, a planned route of the transport convoy and a transport route between the current position of the transport vehicle and the destination position associated with the transport order comprise a common route section.

The transport route between the current position of the transport vehicle 3 and the destination position associated with the transport order describes a possible path along which the transport vehicle 3 can move from the current position of the transport vehicle 3 to the destination position associated with the transport order, for example. It goes without saying that there may be a plurality of possible transport routes between the current position of the transport vehicle 3 and the destination position associated with the transport order that describe different possible paths along which the transport vehicle 3 can move from the current position of the transport vehicle 3 to the destination position associated with the transport order.

The transport route for the transport vehicle 3 is, by way of example, specified, for example by virtue of it being selected from a plurality of possible transport routes. In this case, it is possible for the plurality of possible transport routes to be specified at least in part based on navigation and/or map data and also the starting and destination positions. Subsequently, the transport route for the transport vehicle 3 will be selected from a plurality of possible transport routes, for example. The selection can be made on the basis of one or more predetermined route criteria (e.g. fastest route, shortest route and/or one or more further intermediate destination positions), for example. Further, the selection can also take into consideration whether the transport route has (in particular over longer route sections of the transport route and/or over route sections of the transport route in areas in which complex surroundings situations or capacity bottlenecks frequently arise), common route sections with planned routes of one or more transport convoys. The result obtained for the specification of the transport route is, by way of example, pieces of transport route information that represent the transport route for the transport vehicle 3. As disclosed above, a route can be understood as a path description of a path between multiple positions and, by way of example, can be represented by an ordered list of waypoint statements, each waypoint statement representing a position of a waypoint on the path at which the direction of the path changes. By way of example, there may be provision for the transport route for the transport vehicle 3 to be specified by the control apparatus 1. Alternatively, the transport route can be specified by the server 5, for example, and subsequently applicable pieces of transport route information can be communicated to the control apparatus 1 from the server 5 via the communication connection 20. For example, the pieces of transport route information can be received (i.e. obtained) by the communication interface 16 of the control apparatus 1 together with the pieces of transport route information in step 301 and/or the pieces of transport convoy information in step 302.

As disclosed above, the pieces of transport convoy information can be specified at least in part based on the transport route for the transport vehicle 3. For example, the pieces of transport convoy information are obtained as the result of the specification of the pieces of transport convoy information. To specify the pieces of transport convoy information, the transport route for the transport vehicle can be compared with the route planned for one or more transport convoys, for example. For example, the pieces of transport convoy information represent the identifier(s) of the transport convoys for which the comparison reveals that the planned routes of said transport convoys have in each case a common route section with the transport route for the transport vehicle 3.

There may be provision for the pieces of transport convoy information to be specified by the control apparatus 1. For this, the program memory 11 stores pieces of route information representing the planned routes of different transport convoys, for example, in the form of a database (e.g. a transport convoy database). Alternatively, there may be provision for the pieces of transport convoy information to be specified by the server 5 and subsequently communicated to the control apparatus 1 from the server 5 via the communication connection 20.

It is subsequently assumed by way of example that the pieces of transport convoy information are received (i.e. obtained) in step 302 by the communication interface 16 of the control apparatus 1 from the server 5 via the communication connection 20 and that the pieces of transport convoy information represent the radio signal identifier of the transport convoy 4 that is included in and/or represented by the radio signal 42 transmitted by the radio transmitter 41 of the cargo bike 40. As described above in regard to FIG. 2, the transport route 22 for the transport vehicle 3 and the planned route 23 of the transport convoy 4 have a common route section 24.

It goes without saying that steps 301 and 302 can also be combined in one step, so that the pieces of transport information and the pieces of transport convoy information are obtained in one step and/or at the same time (e.g. are received in one step and/or at the same time), for example.

In a step 303, a first surroundings parameter is captured and/or the capture of the first surroundings parameter is caused. Subsequently, in step 304, the transport convoy 4 is detected at least in part based on the first surroundings parameter captured in step 303 and the pieces of transport convoy information obtained in step 302. For example, the transport convoy 4 is detected in step 304 if the first surroundings parameter captured in step 303 includes a representation of the identifier of the transport convoy 4.

As described above, it is assumed by way of example in the present case that the pieces of transport convoy information obtained in step 302 represent the radio signal identifier of the transport convoy 4 that is included in and/or represented by the Bluetooth signal 42 transmitted by the Bluetooth beacon 41 of the cargo bike 40. Accordingly, the first surroundings parameter is captured in step 303 by receiving a Bluetooth signal in the communication interface 13, for example. For example, the captured first surroundings parameter is a representation of a radio signal identifier included in a received Bluetooth signal and/or represented by a received Bluetooth signal.

For example, the communication interface 13 continuously scans for Bluetooth signals (e.g. at regular or irregular intervals of time) in order to capture the first surroundings parameter. Alternatively, the communication interface 13 scans for Bluetooth signals at least when the transport vehicle is at and/or close to the position 25 (i.e. the beginning of the common route section 24), for example. To this end, the control apparatus 1 can capture the position of the transport vehicle using the position sensor 14, for example, and determine the distance from the position 25. For example, the transport vehicle 3 is close to the position 25 if its distance from the position 25 is less than 100 m, preferably less than 25 m, particularly preferably less than 10 m.

For example, the radio signal identifier included in and/or represented by a Bluetooth signal received in step 303 can be extracted from the Bluetooth signal and subsequently compared in step 304 with the radio signal identifier of the transport convoy 4 in order to determine whether the radio signal identifier of the transport convoy 4 is included therein and/or represented thereby. If it is determined that the radio signal identifier of the transport convoy 4 is included therein and/or represented thereby, the transport convoy 4 is detected, for example, in step 304.

In step 305, a check is performed, by way of example, to determine whether the transport convoy 4 has been detected in step 304. If the transport convoy 4 has not been detected, step 303 is repeated, for example. Otherwise, the flowchart 300 is continued with a step 306, for example.

In step 306, the transport vehicle follows the transport convoys 4 (detected in step 304) and/or the transport vehicle 3 is caused to follow the transport convoy 4. For example, the control apparatus 1 actuates the transport vehicle 3 in step 306 such that the transport vehicle 3 is caused to follow the transport convoy 4.

In an optional step 307, the transport vehicle 3 leaves the transport convoy 4 and/or the transport vehicle 3 is caused to leave the transport convoy 4. For example, the control apparatus 1 actuates the transport vehicle 3 in step 307 such that the transport vehicle 3 is caused to leave the transport convoy 4.

For example, there may be provision for the control apparatus 1 to actuate the transport vehicle 3 in step 307 such that the transport vehicle 3 is caused to leave the transport convoy 4 if the transport convoy is at and/or close to the position 26 (i.e. the end of the common route section 24). To this end, the control apparatus 1 can capture the position of the transport vehicle 3 and hence of the transport convoy 4, for example using the position sensor 14, and determine the distance from the position 26. For example, the transport vehicle 3 is close to the position 26 if its distance from the position 26 is less than 100 m, preferably less than 25 m, particularly preferably less than 10 m.

Subsequently, the transport vehicle 3 can autonomously and/or semiautonomously move along the transport route 22 to the destination position 27. To this end, in an optional step 308, a second surroundings parameter can be captured and/or the capture of the second surroundings parameter can be caused. Subsequently, the destination position 27 is detected in an optional step 309 at least in part based on the captured second surroundings parameter 309.

As described above, FIG. 2 depicts a building 6 at the destination position 27, on which a Bluetooth beacon 60 is arranged that is configured to transmit a Bluetooth signal 61 (e.g. what is known as an advertising signal). The Bluetooth signal 61 includes and/or represents a radio signal identifier in a form of an identifier of the Bluetooth beacon 60, for example, such as an MAC address of the Bluetooth beacon 60. The identifier of the Bluetooth beacon 60 is explicit, at least in the system 2, and therefore allows explicit identification of the destination position 27 (e.g. by virtue of the destination position 27 being appropriately linked to the Bluetooth beacon 60 and/or the identifier of the Bluetooth beacon 60).

Accordingly, the second surroundings parameter is captured in step 308, for example by receiving a radio signal in the communication interface 13. For example, the captured second surroundings parameter is a representation of a radio signal identifier included in a received radio signal and/or represented by a received radio signal.

For example, the communication interface 13 continuously scans for Bluetooth signals (e.g. at regular or irregular intervals of time) in order to capture the first and/or second surroundings parameter. Alternatively, the communication interface 13 scans for radio signals at least when the transport vehicle is at and/or close to the position 25 (i.e. the beginning of the common route section 24) and/or the destination position 27, for example. To this end, the control apparatus 1 can capture the position of the transport vehicle using the position sensor 14, for example, and determine the distance from the position 25 and/or 27. For example, the transport vehicle 3 is close to the position 25 and/or 27 if its distance from the position 25 or 27 is less than 100 m, preferably less than 25 m, particularly preferably less than 10 m.

For example, the radio signal identifier included in and/or represented by a Bluetooth signal received in step 308 can be extracted from the Bluetooth signal and subsequently compared in step 304 with the radio signal identifier of the destination position 27 in order to determine whether the radio signal identifier of the destination position 27 is included therein and/or represented thereby. If it is determined that the radio signal identifier of the destination position 27 is included therein and/or represented thereby, the destination position is detected, for example, in step 309.

Further, it is possible, by way of example, for the direction of reception and/or the direction of propagation of the Bluetooth signal received in step 308 to be determined. The result obtained for the determination is, by way of example, direction information that represents the direction of reception and/or the direction of propagation of the Bluetooth signal. As disclosed above, it is possible, if the Bluetooth beacon 60 is at the destination position, for this direction information to be taken as a basis for determining, by way of example, a direction of travel of the transport vehicle 3 in the direction of the destination position 27, for example in order to allow autonomous and/or semiautonomous movement of the transport vehicle in the direction of the destination position 27. This allows accurate navigation of the transport vehicle 3 to the destination position 27 even if only inaccurate capture of a position of the transport vehicle by the position sensor 14 is possible.

In an optional step 310, a check is performed, by way of example, to determine whether the destination position 27 has been detected in step 309. If the destination position 27 has not been detected, step 308 is repeated, for example. Otherwise, the flowchart 300 is continued with an optional step 311, for example.

In step 311, the transport vehicle 3 autonomously and/or semiautonomously moves to the detected destination position and/or autonomous and/or semiautonomous movement of the transport vehicle 3 to the detected destination position 27 is caused. For example, the control apparatus 1 actuates the transport vehicle 3 in step 311 such that the transport vehicle 3 is caused to autonomously and/or semiautonomously move in the direction of the destination position (e.g. based on a previously determined direction of reception of the Bluetooth signal and/or a direction of travel determined at least in part based thereon).

In summary, the present invention results, inter alia, in the advantage that the path to be traveled by the transport vehicle (e.g. at least on the common route section 24) is predetermined by a leading vehicle (e.g. the cargo bicycle 40), for example, and does not need to be computed by the transport vehicle (e.g. the unmanned transport vehicle 3). The leading vehicle traveling ahead can in this case ensure that the path is fundamentally passable. The monitoring of the autonomous and/or semiautonomous transport vehicle can therefore be restricted (e.g. at least on the common route section 24) to the traveling movement of the leading vehicle, the passability of the path in the direction of travel for the contour and the absence of obstacles in the area between the transport vehicle and the leading vehicle traveling ahead.

The transport vehicle may be an autonomous and/or semiautonomous transport vehicle that obtains transport orders (cf. step 301). The transport orders can come from a central unit (e.g. the server 5) or else from a market place (e.g. a network platform). To fulfil these transport orders, the transport vehicle can follow leading vehicles (e.g. the cargo bike 40) and/or transport convoys (e.g. the transport convoy 4), and travel along the routes (e.g. the planned route 23) suitable for fulfilling the transport order. The leading vehicles and/or the transport convoys have an identifier (e.g. a marking), which can also include an explicit key (e.g. a number or a digit sequence), that renders it identifiable by the transport vehicle. The transport vehicle may likewise have such an identifier (e.g. a marking), so that it is identifiable by other vehicles.

The transport vehicle stores the identifiers of suitable leading vehicles, for example the leading vehicles are assigned to the transport vehicle (cf. step 302). As soon as a suitable leading vehicle is available and the transport vehicle has a transport order, for example, said transport vehicle can join the leading vehicle. The leading vehicle has, by way of example, a communication apparatus (e.g. Bluetooth beacon 41) that it can use to explicitly identify itself to a transport vehicle. As soon as the leading vehicle nears the capture area of the transport vehicle, the transport vehicle can join (i.e. follow) the leading vehicle. Optionally, vehicles already following the leading vehicle are detected, so that a transport convoy (e.g. a train) can be formed.

The assignment of the transport vehicle to a leading vehicle (e.g. to the cargo bicycle 40) and/or to a transport convoy (e.g. the transport convoy 4) can optionally be made in different ways and very flexibly (cf. step 302).

In the event of control by a central unit (e.g. the server 5), the route planning can be effected centrally, for example. The central unit stores, by way of example, the routes and timetables of all the leading vehicles (e.g. the cargo bicycle 40) and/or transport convoys (e.g. the transport convoy 4) registered with it and/or applicable pieces of information (e.g. in the form of a transport convoy database). To this end, the leading vehicles communicate with the central unit (e.g. the cargo bicycle 40 can communicate with the server 5 via the communication connection 21). On the basis of the known routes and timetables, the transport vehicle is assigned to leading vehicles. To this end, communication takes place between central unit and transport vehicle (e.g. the transport vehicle 3 can communicate with the server 5 via the communication connection 20), for example by virtue of the transport vehicle being notified of the identifier of the suitable leading vehicle and/or of the suitable transport convoy. As soon as the transport vehicle joins the assigned leading vehicle and/or the assigned transport convoy, an acknowledgement can be sent to the central unit.

Alternatively or additionally, for an independent assignment, the transport vehicle can store all the possible routes and timetables of leading vehicles (e.g. the cargo bicycle 40) and/or transport convoys (e.g. the transport convoy 4) and/or applicable pieces of information (e.g. in the form of a transport convoy database). The transport vehicle can use internal route planning, for example, to decide about joining a leading vehicle and/or a transport convoy, provided that the journey destination of the leading vehicle and/or of the transport convoy matches the possible transport route of the transport vehicle. Further, the leading vehicle (e.g. the cargo bicycle 40 and/or the radio transmitter 41 of the cargo bicycle 40) can also effect automatic signaling of the planned route when passing a transport vehicle. The transport vehicle then independently decides about joining (and separating from) this leading vehicle. In the case of formation of a convoy, direct communication can be effected between transport vehicle and leading vehicle and/or with an optional central remote server.

Figure 4:
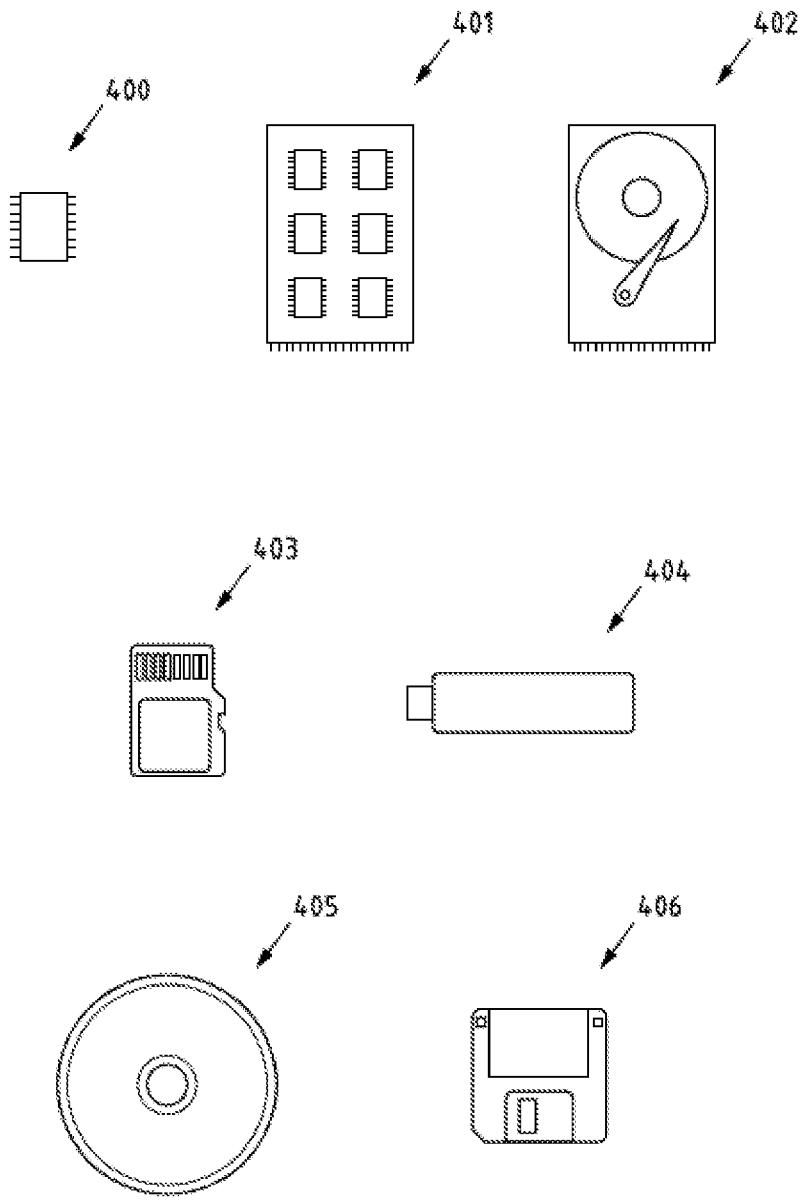
FIG. 4 shows exemplary embodiments of storage media.

Finally, FIG. 4 shows exemplary embodiments of storage media that can store an exemplary embodiment of a disclosed computer program. The storage medium may be a magnetic, electrical, optical and/or other kind of storage medium, for example. The storage medium may, by way of example, be part of a processor (e.g. the processor 10 of FIG. 1), for example a (nonvolatile or volatile) program memory of the processor or a portion thereof (e.g. memory 11 in FIG. 1). Exemplary embodiments of a storage medium are a flash memory 400, an SSD hard disk 401, a magnetic hard disk 402, a memory card 403, a memory stick 404 (e.g. a USB stick), a CD-ROM or DVD 405, or a floppy disk 406.

The exemplary embodiments of the present invention that are described in this specification are also intended to be understood as disclosed in all combinations with one another. In particular, the description of a feature that an embodiment comprises is—unless explicitly explained to the contrary—also not intended to be understood, in the present case, to mean that the feature is indispensable or essential for the function of the exemplary embodiment. The sequence of the method steps outlined in this specification in the individual flowcharts is not imperative, and alternative sequences of the method steps are conceivable—unless indicated otherwise. The method steps can be implemented in different ways, and implementation in software (by virtue of program instructions), hardware or a combination of the two is conceivable for implementing the method steps.

Terms used in the patent claims such as "comprise", "have", "contain", "include" and the like do not exclude further elements or steps. The wording "at least in part" covers both the "in part" case and the "in full" case. The wording "and/or" is intended to be understood to mean that both the alternative and the combination are intended to be disclosed, that is to say that "A" and/or "B" means "(A) or (B) or (A and B)". A plurality of units, people or the like means multiple units, people or the like within the context of this specification. The use of the indefinite article does not exclude a plurality. A single device can perform the functions of multiple units or devices cited in the patent claims. Reference signs specified in the patent claims are not intended to be regarded as restrictions for the means and steps employed.

The invention claimed is:

1. A method performed by an autonomous and/or semiautonomous transport vehicle and/or a control apparatus for the autonomous and/or semiautonomous transport vehicle, the method comprising:
   obtaining pieces of transport information for a transport order, wherein the pieces of transport information represent at least one destination position associated with the transport order;
   obtaining pieces of transport convoy information, wherein the pieces of transport convoy information represent at least one identifier of a transport convoy, and wherein a planned route of the transport convoy and a transport route between a current position of the transport vehicle and the at least one destination position associated with the transport order comprise a common route section;
   capturing and/or causing a capture of a first surroundings parameter when the transport vehicle is at a beginning of the common route section;
   detecting the transport convoy at least in part based on the captured first surroundings parameter and the obtained pieces of transport convoy information, wherein, when the first surroundings parameter is captured and when the transport convoy is detected, the transport vehicle is not part of the transport convoy, and wherein the transport convoy is detected at least in part based on the captured first surroundings parameter if the captured first surroundings parameter includes a representation of the at least one identifier of the transport convoy; and
   joining, by the transport vehicle, the detected transport convoy by following the detected transport convoy and/or causing the transport vehicle to join the detected transport convoy by causing the transport vehicle to follow the detected transport convoy.

2. The method according to claim 1, the method further comprising:
   capturing and/or causing the capture of a position of the transport vehicle.

3. The method according to claim 1, the method further comprising:
   if the transport convoy is at an end of the common route section, leaving the transport convoy in the transport vehicle and/or causing the transport vehicle to leave the transport convoy; and
   autonomously and/or semiautonomously moving and/or causing the autonomous and/or semiautonomous movement of the transport vehicle to the at least one destination position associated with the transport order.

4. The method according to claim 3, wherein the planned route of the transport convoy and the transport route meet at the beginning of the common route section and separate at the end of the common route section.

5. The method according to claim 3, the method further comprising:
   capturing and/or causing the capture of a second surroundings parameter;
   detecting the at least one destination position at least in part based on the captured second surroundings parameter, wherein the transport vehicle autonomously and/or semiautonomously moves to the detected at least one destination position and/or the autonomous and/or semiautonomous movement of the transport vehicle to the detected at least one destination position is caused.

6. The method according to claim 5, wherein the pieces of transport information represent an identifier of the at least one destination position, and wherein the at least one destination position is detected at least in part based on the captured second surroundings parameter if the captured second surroundings parameter includes a representation of the identifier of the at least one destination position.

7. The method according to claim 1, the method further comprising:
specifying and/or causing a specification of the transport route between the current position of the transport vehicle and the at least one destination position associated with the transport order.

8. A control apparatus for an autonomous and/or semiautonomous transport vehicle, the control apparatus comprising at least one processor and at least one memory having program instructions, wherein the at least one memory and the program instructions are configured so as, together with the at least one processor, to cause the control apparatus to perform:
obtaining pieces of transport information for a transport order, wherein the pieces of transport information represent at least one destination position associated with the transport order;
obtaining pieces of transport convoy information, wherein the pieces of transport convoy information represent at least one identifier of a transport convoy, and wherein a planned route of the transport convoy and a transport route between a current position of the transport vehicle and the at least one destination position associated with the transport order comprise a common route section;
capturing and/or causing a capture of a first surroundings parameter when the transport vehicle is at a beginning of the common route section;
detecting the transport convoy at least in part based on the captured first surroundings parameter and the obtained pieces of transport convoy information, wherein, when the first surroundings parameter is captured and when the transport convoy is detected, the transport vehicle is not part of the transport convoy, and wherein the transport convoy is detected at least in part based on the captured first surroundings parameter if the captured first surroundings parameter includes a representation of the at least one identifier of the transport convoy; and
causing the transport vehicle to join the detected transport convoy by causing the transport vehicle to follow the detected transport convoy.

9. The control apparatus according to claim 8, wherein the at least one memory and the program instructions are further configured so as, together with the at least one processor, to cause the apparatus to perform:
capturing and/or causing the capture of a position of the transport vehicle.

10. The control apparatus according to claim 8, wherein the at least one memory and the program instructions are further configured so as, together with the at least one processor, to cause the control apparatus to perform:
if the transport convoy is at an end of the common route section, causing the transport vehicle to leave the transport convoy; and
causing the autonomous and/or semiautonomous movement of the transport vehicle to the at least one destination position associated with the transport order.

11. The control apparatus according to claim 10, wherein the planned route of the transport convoy and the transport route meet at the beginning of the common route section and separate at the end of the common route section.

12. The control apparatus according to claim 10, wherein the at least one memory and the program instructions are further configured so as, together with the at least one processor, to cause the apparatus to perform:
capturing and/or causing the capture of a second surroundings parameter;
detecting the at least one destination position at least in part based on the captured second surroundings parameter, wherein the transport vehicle autonomously and/or semiautonomously moves to the detected destination position and/or the autonomous and/or semiautonomous movement of the transport vehicle to the detected at least one destination position is caused.

13. The control apparatus according to claim 12, wherein the pieces of transport information represent an identifier of the at least one destination position, and wherein the at least one destination position is detected at least in part based on the captured second surroundings parameter if the captured second surroundings parameter includes a representation of the identifier of the at least one destination position.

14. The control apparatus according to claim 13, wherein the identifier of the at least one destination position is a wirelessly capturable identifier, in particular an optical identifier and/or a radio signal identifier.

15. The control apparatus according to claim 8, wherein the at least one identifier of the transport convoy is a wirelessly capturable identifier, in particular an optical identifier and/or a radio signal identifier.

16. The control apparatus according to claim 8, wherein the at least one memory and the program instructions are further configured so as, together with the at least one processor, to cause the control apparatus to perform:
specifying and/or causing a specification of the transport route between the current position of the transport vehicle and the destination position associated with the transport order.

17. The control apparatus according to claim 8, wherein the obtaining of the pieces of transport convoy information comprises:
specifying the pieces of transport convoy information at least in part based on the transport route.

18. The control apparatus according to claim 8, wherein the obtaining of the pieces of transport convoy information comprises:
receiving the pieces of transport convoy information from a remote apparatus.

19. A non-transitory, computer-readable storage medium in which computer program code is stored, the computer program code when executed by a processor causing a control apparatus, to perform:
obtaining pieces of transport information for a transport order, wherein the pieces of transport information represent at least one destination position associated with the transport order;
obtaining pieces of transport convoy information, wherein the pieces of transport convoy information represent at least one identifier of a transport convoy, and wherein a planned route of the transport convoy and a transport route between a current position of the transport vehicle and the at least one destination position associated with the transport order comprise a common route section;
capturing and/or causing a capture of a first surroundings parameter when the transport vehicle is at a beginning of the common route section;
detecting the transport convoy at least in part based on the captured first surroundings parameter and the obtained pieces of transport convoy information, wherein, when the first surroundings parameter is captured and when the transport convoy is detected, the transport vehicle is not part of the transport convoy, and wherein the transport convoy is detected at least in part based on the captured first surroundings parameter if the captured first surroundings parameter includes a representation of the at least one identifier of the transport convoy; and
joining, by the transport vehicle, the detected transport convoy by following the transport convoy and/or causing the transport vehicle to join the detected transport convoy by causing the transport vehicle to follow the detected transport convoy.

\* \* \* \* \*